United States Patent [19]

Mochizuki

[11] Patent Number: 5,579,178
[45] Date of Patent: Nov. 26, 1996

[54] ELECTRICALLY POWERED FOLDABLE REARVIEW MIRROR FOR AUTOMOBILES INCLUDING A SEALING STRUCTURE FOR A DRIVING UNIT

[75] Inventor: Toshihiro Mochizuki, Fujieda, Japan

[73] Assignee: Murakami Kaimeido Co., Ltd., Shizuoka, Japan

[21] Appl. No.: 423,034

[22] Filed: Apr. 17, 1995

[30] Foreign Application Priority Data

Apr. 19, 1994 [JP] Japan .................................. 6-103238

[51] Int. Cl.⁶ .......................... G02B 7/182; B60R 1/06
[52] U.S. Cl. .......................... 359/841; 359/872; 359/877
[58] Field of Search .................... 359/514, 841, 359/872, 877

[56] References Cited

U.S. PATENT DOCUMENTS

| | | | |
|---|---|---|---|
| 4,626,083 | 12/1986 | Nakayama et al. | 359/877 |
| 4,626,084 | 12/1986 | Kumai | 359/877 |
| 4,786,157 | 11/1988 | Mori et al. | 359/877 |
| 4,832,477 | 5/1989 | Torii et al. | 359/877 |
| 4,919,526 | 4/1990 | Umekawa et al. | 359/841 |
| 5,190,499 | 3/1993 | Mori et al. | 359/877 |

*Primary Examiner*—Ricky D. Shafer
*Attorney, Agent, or Firm*—Michael J. Striker

[57] ABSTRACT

An electrically powered foldable rearview mirror includes a sealing structure of a driving unit capable of preventing from water flooding through a clearance for receiving harness cords to be wired, in which the sealing cap is mounted over a frame periphery to cover an upper surface of a motor and a reduction gear train, a harness cord receiving hole connecting to a motor terminal and a harness cord ejecting hole engaging in a cylindrical shaft of the frame are respectively provided on the sealing cap, and the sealing cap is engaged over the rotating shaft upper end to have an air permeable clearance between the harness cord ejecting hole and the shaft upper end.

8 Claims, 3 Drawing Sheets

5,579,178

ELECTRICALLY POWERED FOLDABLE REARVIEW MIRROR FOR AUTOMOBILES INCLUDING A SEALING STRUCTURE FOR A DRIVING UNIT

BACKGROUND OF THE INVENTION

1. Field of the Invention

The present invention relates to an electrically powered foldable rearview mirror for automobiles and, more particularly, to a mirror for automobiles in which a shaft is fixed to a mirror base portion, a frame is rotatably mounted on said shaft to support a mirror body, and a driving control unit comprises a motor for folding the mirror, a gear train for reduction of a rotation speed generated by the motor and positioning means, thereby the mirror body is rotated to an erected position or a folded position, further relates to the electrically powered foldable rearview mirror for automobiles including a sealing structure for an actuating unit, in which a sealing cap is fitted on the frame to seal the driving unit so that the unit is prevented from flooding through the clearance between the sealing cap and the frame.

2. Description of the Relevant Art

In these years some of automobiles having various types of functions are proposed so as to progress an added value. For example there are electrically powered foldable rearview mirrors in which a mirror body can be folded and contained therein when the automobile is to be parked, a heating device or a ultrasonic oscillating device is provided therewith for removing water drops sticking on a mirror surface or an actuator for adjusting a reflection angle of the mirror surface or an automatic anti-glare device or the like for decreasing a glare light from a head lamp of the following vehicle.

In the conventional electrically powered foldable rearview mirror, as shown in FIG. 4, a sealing cap 50 is attached to fit on a frame 51 so that an inside electrically powered foldable device (so called hereinbelow including an electronic device) is protected from flooding of water or the like thus protecting from a mechanical shock.

That is a driving unit comprises an electric drive motor for folding a mirror which is covered an upper surface thereof with the sealing cap 50 and reduction gear train which are connected to an output axis of the motor. The driving unit is attached to a root portion of the frame 51 so that a mirror body is fixed to a bracket 52 of the frame 51 and rotates around a cylindrical shaft which is erected on a mirror base. A driving current and a controlling signal for the motor or the like are supplied via the harness cord 53. The harness cord 53 extends from the automobile body side through the shaft inside diameter via a small access 54 provided between the sealing cap 50 and the frame 51 toward an outside of the sealing cap 50. Thereafter harness cord is connected to said motor and the heater device, to the ultrasonic oscillator, to the mirror reflection angle adjusting actuator or to the automatic anti-glare device (not shown) via a various kinds of connector.

In view of a necessity for the replacement of the harness cord 53 at the time of wiring for the mirror assembly or at the time of the repair of the assembly, or for facility of the wiring works, the access 54 size is set to be larger than a bundle of a plurality of harness cords 53. As shown in FIG. 5 is a partially cross-sectional view taken alone line A—A of FIG. 4, the access 54 which is provided between the sealing cap 50 and the frame 51 is covered by attaching a rubber or elastomer made resilient projection 56 or a packing material such as a grommet which are attached to the sealing cap 50 inside to be water proof or to be protected from the dust.

Conventionally, however, there has been a problem that water floods into the sealing cap 50 inside due to the capillarity phenomenon through a slight small space formed between said sealing cap 50 and the frame 51, and especially for automobiles being washed by a high pressure washing, it has caused disadvantages that the washing water can flood thereinto.

Furthermore there is a fear that harness cords are led to the wrong access other than the determined access at the time of wiring of assemblies or of the repair. The synthetic resin made sealing cap 50 is easily deformed and there has been a problem of causing water flood through said deformed parts so that an even sealing can not be achieved due to harness cords biting or due to a recoverying force of packing materials 58 which are packed therein. While there has been a problem that the complete water proof effect could not be achieved by conventional mirrors so that water flood has been more easily caused if the cap could not be filled with such resilient projection or packing materials.

SUMMARY OF THE INVENTION

It is an object of the present invention to provide an electrically powered foldable rearview mirror capable of preventing a driving unit from water flooding through a clearance of a sealing cap and a frame and to provide a rearview mirror improved in the facility of wiring harness cords thus eliminating the possibility of biting them between the sealing cap and the frame.

According to one of preferred embodiments of the present invention, an electrically powered foldable rearview mirror for an automobile comprises a cylindrical shaft erected on an extending portion of a mirror base, a frame rotatably mounted on the shaft to support a mirror body, a motor for folding the mirror body and a speed reduction gear train respectively attached on a frame root portion to reduce a rotation speed generated by the motor, and a positioning means disposed between the frame and the shaft or between a receiving gear and the frame which are attached on the shaft so as to halt and hold the mirror body at the erected position and at the folded position. The mirror body is rotated in an erected position and a folded position by a drive control device as described hereinbefore.

The electrically powered foldable rearview mirror of the invention further comprises a chamber formed on the frame for containing the motor and the speed reduction gear train and a sealing cap engaged on the outside of the chamber so as to seal the motor and the speed reduction gear train. A harness cord ejecting hole with a faucet joint and a hole for receiving a connector of supplying a motor an electric power source are respectively disposed on the upper portion of the sealing cap and said harness cord ejecting hole is formed to communicate with the cylindrical shaft having a slight clearance between the sealing cap and the shaft.

The harness cord ejecting hole is disposed on the sealing cap to form the faucet joint so that a groove capable of receiving the shaft upper end portion is surrounded by the inner cylindrical portion which is inserted inside of the shaft upper end portion, the rim which is disposed on the upper end of the inner cylindrical portion and the outer cylindrical portion which is disposed extending downwardly from the outer periphery of the rim, respectively uniformed with the sealing cap so as to have an air permeable clearance between the groove and the shaft.

A harness cord is wired downwardly from the mirror base through the cylindrical shaft and is led out of the harness cord ejecting hole.

A connector for supplying the motor electric power source is attached on an end of the harness cord to press into the connector receiving hole via a sealed sleeve.

Advantageously in above described embodiment, it is possible to engage and fix the sealing cap uniformly to the outer surface of the chamber which is formed on the frame and the sealing cap will not be deformed. After assembling the frame in the mirror body, harness cords can be easily and ensure wired downwardly from the mirror base to the cylindrical shaft. The motor power source supplying connector is so pressed in the connector receiving hole via sealed sleeve enabling easily sealing of the motor and harness cords that harness cords are prevented from biting between the sealing cap and the frame.

Furthermore the harness cord ejecting hole is disposed on the sealing cap to form a faucet joint so that the groove is capable of receiving the shaft upper end and said groove is surrounded by the inner cylindrical portion which is inserted into the shaft upper end portion, the rim which is disposed on the upper end of the inner cylindrical portion and the outer cylindrical portion which is disposed extending downwardly from whole outside periphery of the rim, respectively uniformed with the sealing cap. Therefore at the time of washing automobiles and water flowing from upper of the mirror to said harness cord ejecting hole, water can not flood into the sealing cap but flow down through the shaft. In condition of fitting the sealing cap to fit over the shaft upper end, air pressure difference in and out of the sealing cap is prevented by an air permeable clearance which is formed between the groove and the shaft.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
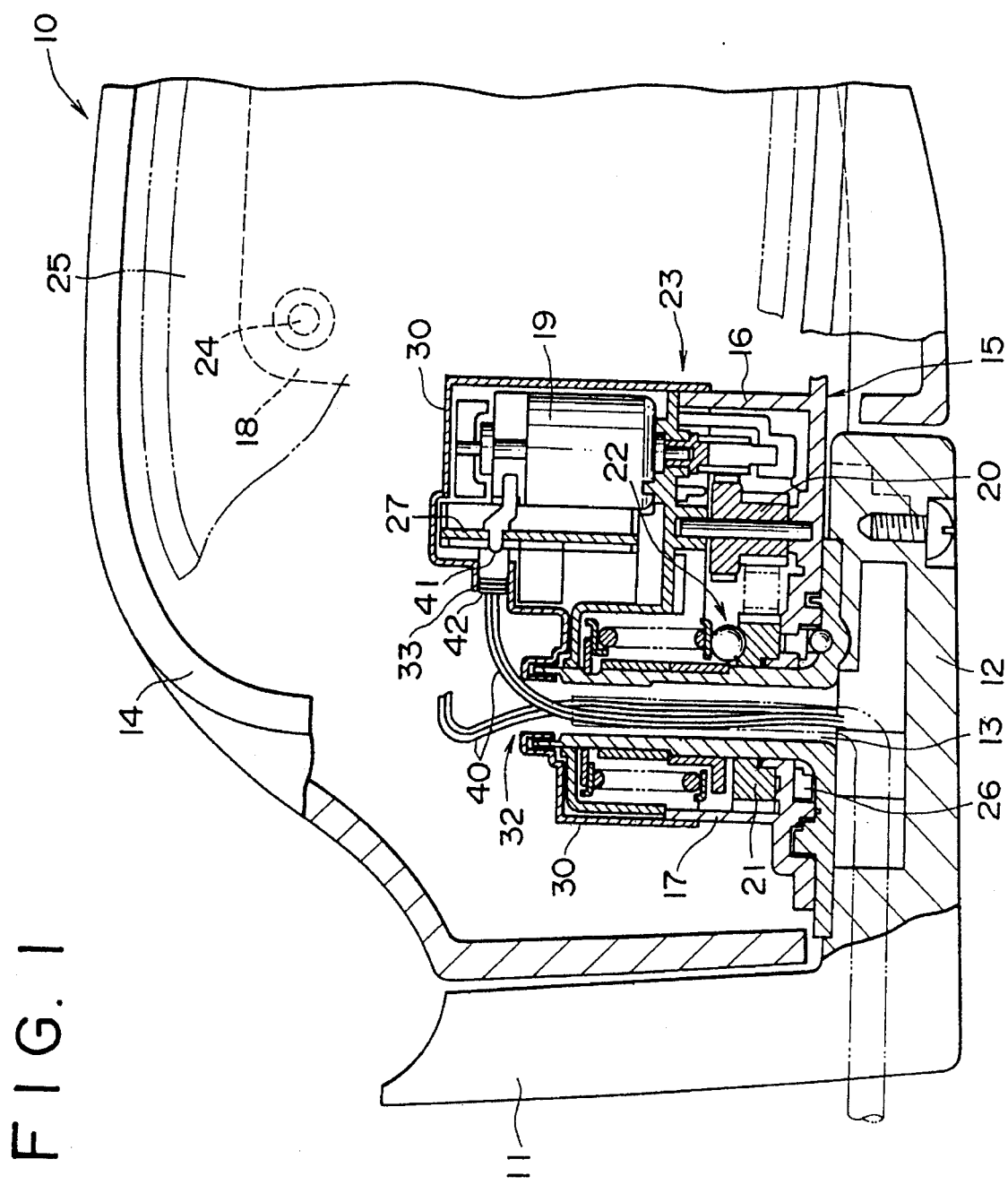
FIG. 1 is a fragmentary schematic front elevational view, partly out away, of a driving unit of an electrically powered foldable rearview mirror according to one embodiment of the present invention.

As shown in FIG. 1, in an electrically powered foldable rearview mirror 10 according to the present invention, a mirror body 14 is rotatably supported on a cylindrical shaft 13 which is erected on an extending (projecting) portion 12 of a mirror base 11. A frame 15 is fixed to the mirror body 14 and a chamber 16 is formed at the base portion of the frame 15 so as to house an electric drive means (motor) 19, a worm to reduce a rotation speed generated by the motor and a speed reduction mechanism 20 comprising twin gears or the like (not shown). The end gear of the speed reduction mechanism is engaged with a receiving gear 21 which is attached on the shaft 13. The receiving gear 21 is fixed to the shaft 13 via a clutch means 22 and is also to be free from the shaft 13 at the time of an enforced rotation of the mirror body.

The frame 15 comprises the chamber 16 and a bracket 18 so that the chamber 16 is provided with a hole to lead the shaft 13 toward the base portion of the frame 15 and the bracket 18 erects from one end of the base of the frame 15. The bracket 18 is fixed to the mirror body inner wall via several of screws 24 and a mirror element 25 is attached to the front surface of the bracket 18. A positioning means 26 is mounted between the frame 15 and the shaft 13 for halting and holding the mirror body 14 at the erected position and at the folded position, further more it is not shown in drawings, the receiving gear 21 may be engaged with the end gear of a driving unit 23 which is composed of the electric driving means 19 and the speed reduction mechanism 20 and the positioning means 26 may be disposed between the receiving gear 21 and the frame 15 for halting the mirror body 14 at the erected position and the folded position.

A sealing cap 30 is disposed to cover the driving unit 23 composed of the electric driving means 19 and the speed reduction mechanism 20 and the bottom portion of said cap 30 is engaged to adhere to the outer surface of a standing wall 17 of the chamber 18.

Figure 2:
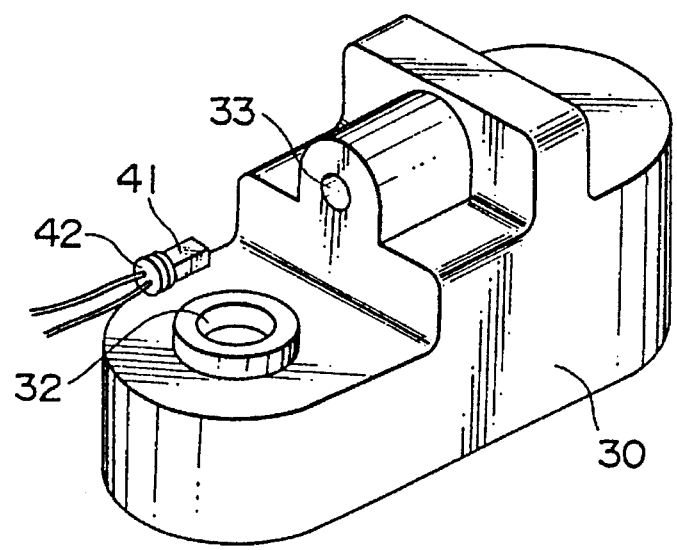
FIG. 2 is a perspective view showing a sealing cap used in the rearview mirror according to the present invention.
Figure 3:
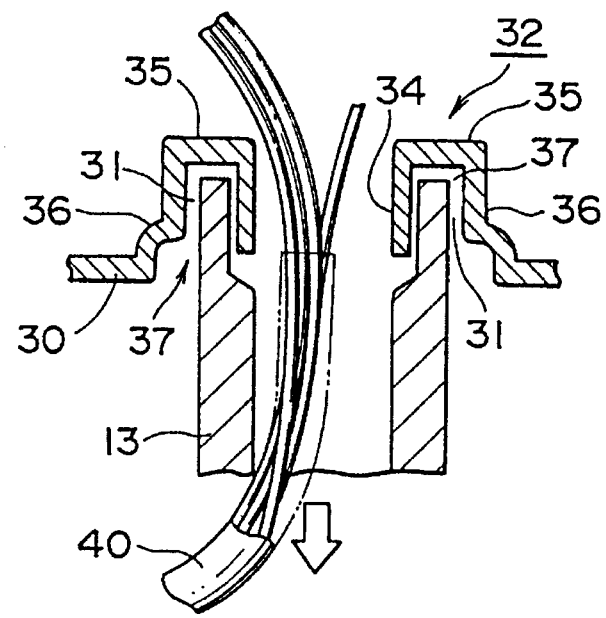
FIG. 3 is an enlarged cross-sectional view, partly out away, showing a harness cord ejecting hole and the condition of fitting the sealing cap over a shaft upper end portion of the rearview mirror according to the present invention.
Figure 4:
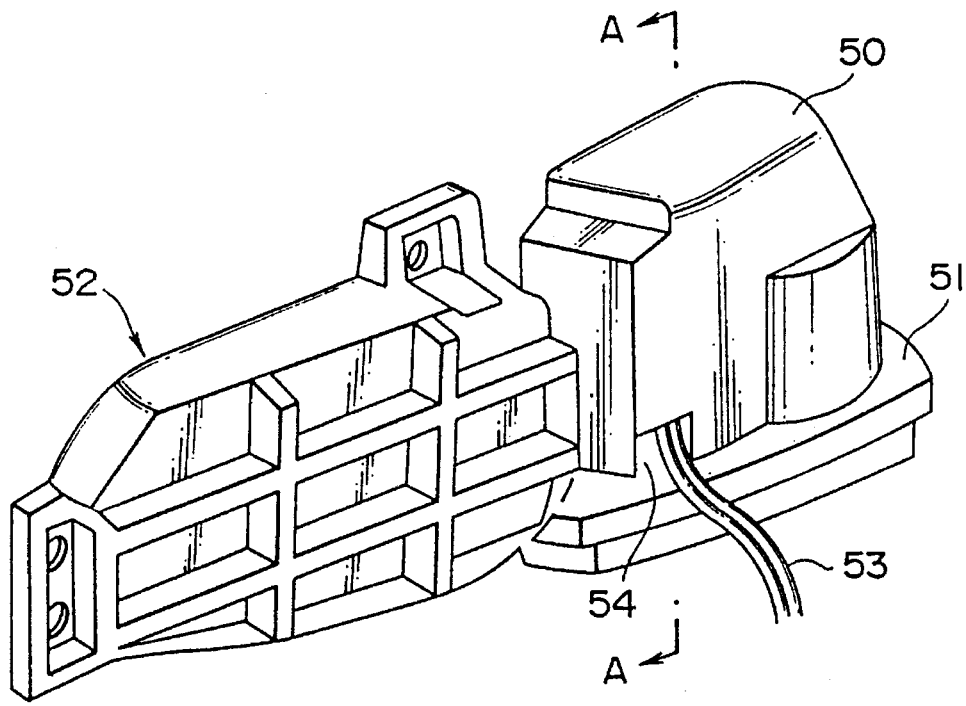
FIG. 4 is a perspective view showing a frame, a sealing cap and a harness cord of the conventional rearview mirrors.
Figure 5:
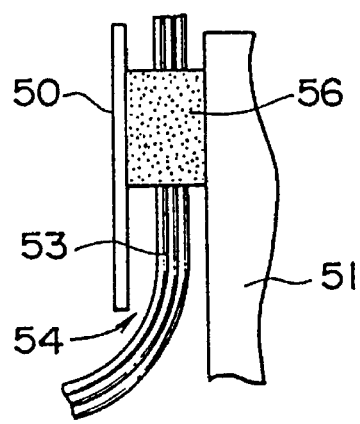
FIG. 5 is a cross-sectional view, partly out away, taken along line 36—36 of FIG. 4.

On upper portion of the sealing cap 30, as shown in FIG. 2 and FIG. 3, a harness cord ejecting hole 32 with a faucet joint and a hole 33 for receiving the motor electric power source supplying connector are respectively provided and the harness cord ejecting hole 32 communicates with the shaft 13 to have a slight clearance therebetween.

The harness cord ejecting hole 32 is disposed on the sealing cap 30 to form a faucet joint so that a groove 37 is surrounded by an inner cylindrical portion 34 inserted in the inside of the shaft upper end portion, a rim 35 positioned at said upper end of the inner cylindrical portion and an outer cylindrical portion 36 extended downwardly from the whole outer periphery of the rim, respectively uniformed with said sealing cap 30 and an air permeable clearance 31 is formed between the shaft 13 and the groove 37.

A harness cord 40 is wired upwardly from the extending portion 12 of the mirror base through the cylindrical shaft 13 and is led out of the harness cord ejecting hole 32 toward inside of the mirror body A connector 41 for supplying the motor electric power source is attached at one end of the harness cord and is pressed into the connector inserting hole 33 via a sealed sleeve 42. The connector 41 is contained in the sealing cap 30 and is connected to the motor 19 via a motor control substrate 27 in a manner as shown FIG. 1.

The harness cord ejecting hole 32 in a condition of fitting the sealing cap 30 over the cylindrical shaft is shown by FIG. 3 and a certain sized clearance is provided between the groove 37 and the shaft upper portion to permit an air to flow therethrough. Consequently the sealing cap is prevented from absorbing water due to an air pressure difference because of there being no air pressure difference in and out of the cap and further more, in an accident that the sealing cap inside is heated by a heat generation of the motor or the like, a trouble of an over heating or the like can be prevented from the unit because of an air permeability of said clearance.

As clearly shown in FIG. 3, since the harness cord ejecting hole 32 is to be engaged over the shaft upper end, in condition of the bad weather or at the time of washing cars, water which floods downwardly from the mirror body upside falls downwardly via the shaft and it is possible to protect the electrical driving unit of the sealing cap inside from external rain flood.

In accordance with the embodiment of the present invention, it causes no deformation of the sealing cap due to conventional water proof material such as sponge or grommet to enable a simple and a sure engagement of the sealing cap with the frame periphery and to provide a facile wiring of the harness cord without the fear of biting the wired harness cord between the sealing cap and the frame. Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not ,restrictive. The scope of the invention is indicated by the appended claims rather than by the foregoing description.

We claim:

1. An electrically powered foldable rearview mirror for automobiles, comprising a mirror base attachable to an automobile body and having an extending portion; a cylindrical shaft arranged on said extending portion and having an upper end; a frame rotatably mounted around said cylindrical shaft; a mirror body supported on said frame; a driving unit provided in said mirror body and including an electrically powered folding motor disposed on said frame, and a speed reduction mechanism connected to an output axis of said motor; a connector for supplying electric power to said motor; positioning means so as to halt and hold said mirror body at an erected position and at a folded position; a containing chamber formed on said frame; a sealing cap engaged on outside of said chamber so as to seal said motor and said speed reduction mechanism, said sealing cap having a harness cord ejecting hole with a faucet joint and a hole for receiving said connector for supplying electric power to said motor so that said harness cord ejection hole communicates with and grips said upper end of said cylindrical shaft, said sealing cap being arranged so that a slight clearance is provided between said sealing cap and said upper end of said shaft and extends radially outside, above and radially inside said upper end of said shaft.

2. An electrically powered foldable rearview mirror as defined in claim 1, wherein said frame has a root portion, said motor being arranged on said root portion of said frame.

3. An electrically powered foldable rearview mirror as defined in claim 1, wherein said chamber has a standing wall, said sealing cap being engaged on the outside of said standing wall of said chamber.

4. An electrically powered foldable rearview mirror as defined in claim 1; further comprising a harness cord extending upwardly from said mirror base through said cylindrical shaft and passing out through said harness cord ejecting hole.

5. An electrically powered foldable rearview mirror as defined in claim 1, wherein said connector for supplying said motor with electric power is attached on an end of a harness cord so as to press into said hole for receiving said connector with interposition of a sealed sleeve.

6. An electrically powered foldable rearview mirror as defined in claim 1, wherein said positioning means is disposed between said frame and said shaft.

7. An electrically powered foldable rearview mirror as defined in claim 1, wherein said driving unit has an end gear and a receiving gear which is connected to said end gear, said positioning means being disposed between said frame and said receiving gear.

8. An electrically powered foldable rearview mirror for automobiles, comprising a mirror base attachable to an automobile body and having an extending portion; a cylindrical shaft arranged on said extending portion and having an upper end; a frame rotatably mounted around said cylindrical shaft; a mirror body supported on said frame; a driving unit provided in said mirror body and including an electrically powered folding motor disposed on said frame, and a speed reduction mechanism connected to an output axis of said motor; a connector for supplying electric power to said motor; positioning means so as to halt and hold said mirror body at an erected position and at a folded position; a containing chamber formed on said frame; a sealing cap engaged on outside of said chamber so as to seal said motor and said speed reduction mechanism, said sealing cap having a harness cord ejecting hole with a faucet joint and a hole for receiving said connector for supplying electric power to said motor so that said harness cord ejection hole communicates with and grips said upper end of said cylindrical shaft, said sealing cap being arranged so that a slight labyrinth-shaped clearance is provided along a shaft diameter direction between said sealing cap and said upper end of said shaft, said sealing cap having an inner cylindrical portion located inside of an upper portion of said shaft, an outer cylindrical portion located outside of said upper end portion of said shaft, and a rim connecting said inner cylindrical portion and said outer cylindrical portion with one another so as to form between said upper portion of said shaft and said portions of said cap a groove forming air permeable clearance.

* * * * *